US006766156B1

(12) United States Patent
Hayashihara

(10) Patent No.: US 6,766,156 B1
(45) Date of Patent: Jul. 20, 2004

(54) RADIO TRANSMITTER-RECEIVER, HIGH-FREQUENCY RADIO RECEIVER, AND CONTROL UNIT

(75) Inventor: Mikio Hayashihara, Sagamihara (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/424,148

(22) PCT Filed: Mar. 18, 1999

(86) PCT No.: PCT/JP99/01364

§ 371 (c)(1),
(2), (4) Date: Nov. 19, 1999

(87) PCT Pub. No.: WO99/49585

PCT Pub. Date: Sep. 30, 1999

(30) Foreign Application Priority Data

Mar. 20, 1998  (JP) .......................................... 10-072643

(51) Int. Cl.[7] ................................................ H04B 1/10
(52) U.S. Cl. ........................ 455/295; 455/78; 455/230; 330/296
(58) Field of Search ......................... 370/335; 455/295, 455/78, 83, 230, 423, 574; 330/296

(56) References Cited

U.S. PATENT DOCUMENTS

| 4,637,073 A | * | 1/1987 | Selin et al. ................... 455/78 |
| 5,056,109 A | * | 10/1991 | Gilhousen et al. ............. 375/1 |
| 5,179,724 A | * | 1/1993 | Lindoff ........................ 455/76 |
| 5,428,824 A | * | 6/1995 | Kasai .......................... 455/78 |
| 5,511,234 A | * | 4/1996 | Ha .............................. 455/127 |
| 5,590,411 A | * | 12/1996 | Sroka et al. ................... 455/78 |
| 5,646,701 A | * | 7/1997 | Duckworth et al. ...... 340/825.69 |
| 5,697,081 A | * | 12/1997 | Lyall, Jr. et al. ............. 455/249.1 |
| 5,710,975 A | * | 1/1998 | Bernhardt et al. ........... 455/38.3 |
| 5,729,572 A | * | 3/1998 | Oh ............................. 375/219 |
| 5,815,821 A | * | 9/1998 | Pettersson ................... 455/575 |
| 6,107,878 A | * | 8/2000 | Black ......................... 330/129 |
| 6,144,259 A | * | 11/2000 | Kirisawa ..................... 330/296 |
| 6,175,279 B1 | * | 1/2001 | Ciccarelli et al. ............ 330/296 |
| 6,311,048 B1 | * | 10/2001 | Loke ........................ 455/245.1 |

FOREIGN PATENT DOCUMENTS

| JP | 61-40051 | 3/1986 |
| JP | 63-314030 | 12/1988 |
| JP | 5-347568 | 12/1993 |
| JP | 8-307302 | 11/1996 |
| JP | 8-340274 | 12/1996 |
| JP | 10-242886 | 9/1998 |
| JP | 10-290173 | 10/1998 |

* cited by examiner

Primary Examiner—William Trost
Assistant Examiner—Stephen D'Agosta
(74) Attorney, Agent, or Firm—Finnegan, Henderson, Farabow, Garrett & Dunner, L.L.P.

(57) ABSTRACT

A low-noise amplifier 500a having low-distortion characteristics (low distortion LNA), a low-noise amplifier 500b of a low current consumption type(low current consumption LNA), and radio-frequency switches 502 and 509 for selectively switching either of them are provided in a receiving radio-frequency unit 103. On the basis of a mode changing control function of a CPU 113, an LNA switch control signal AS is generated so that the low-distortion LNA 500a is selected during a period in which the operation of a radio transmitter-receiver is in a transmitting/receiving state, and that the low current consumption LNA 500b is selected in a period of a standby state, and thus the switching of the radio-frequency switches 502 and 509 of a low-noise amplifier circuit section 501 is controlled.

4 Claims, 10 Drawing Sheets

RADIO TRANSMITTER-RECEIVER, HIGH-FREQUENCY RADIO RECEIVER, AND CONTROL UNIT

TECHNICAL FIELD

The present invention relates to a radio transmitter-receiver of so called a simultaneous transmitting and receiving system, capable of receiving a downstream radio signal transmitted from a base station while transmitting an upstream radio signal having amplitude variation components, such as a mobile terminal apparatus employing the CDMA (Code Division Multiple Access) scheme.

BACKGROUND ART

Recently, a cellular radio communications system has been rapidly widespread in accordance with the increase in the needs for the mobile communications and the development of the communications techniques.

A mobile terminal apparatus used in the cellular radio communications system, for example, receives a radio frequency signal transmitted from a base station, by an antenna, inputs the signal to a receiving radio-frequency unit via an antenna duplexer, high-frequency-amplifies the signal, removes unnecessary waves outside the receiving band from the signal, converts the signal to an intermediate frequency signal, demodulates the intermediate frequency signal by a demodulator, and converts the signal into a baseband signal. The transmitting baseband signal is subjected to a predetermined signal process, input to a modulator, which modulates a carrier wave signal. The modulated carrier wave signal is converted into a radio frequency by a transmitting radio-frequency circuit and amplified to a predetermined transmitting power, and transmitted to the base station from the antenna via the duplexer.

Incidentally, the receiving radio-frequency unit uses a low noise amplifier as a radio-frequency amplifier. In a conventional analog mobile terminal apparatus employing the FM scheme as its modulation scheme, for example, the distortion characteristics of the low-noise amplifier is generally set to be such that the input tertiary interception point (IIP3) can be about −3 [dBm], at which the apparatus can bear the mutual modulation disturbance generated by adjacent and the following adjacent channels. In this case, the low-noise amplifier can be implemented with the consumed current of a few [mA].

In the mobile terminal apparatus employing the CDMA scheme, however, its own transmitting wave has amplitude variation components as shown in, for example, FIG. 1. For this reason, when a narrow-band disturbance tone signal in the analog cellular system using a near-field band of the CDMA cellular system exists near the desired receiving wave, the amplitude variation components of its own transmitting wave which cannot be attenuated by the duplexer causes the cross modulation resulting from the tertiary distortion of the low-noise amplifier to be generated, and overlap the disturbance tone signal as shown in FIG. 2, and part of it is added to the receiving band as interference.

The CDMA cellular system employs what is called open-loop transmission power control, which allows the transmitting signal power of the mobile terminal apparatus to be increased when the mobile terminal apparatus is remote from the base station and when the received signal level is low. When the mobile terminal apparatus exists in a place where the received signal level is low, such a case where the mobile terminal apparatus exists in, for example, a fringe area of a cell, deterioration of the receiving characteristics is accelerated because of the interference caused by the cross modulation effect, which may cause the communications to be interrupted in a worst case.

To solve this problem, the IIP3 of the low-noise amplifier provided in the receiving radio-frequency unit needs to be set at about 5–7 dB. In order to implement this, however, the consumed current needs to be increased to about 10 to about 20 [mA], and this will cause the standby time of the CDMA mobile terminal apparatus to be made remarkably shorter, which is not very preferable.

On the other hand, some measures to be taken, i.e. further increasing the attenuation amount of the transmitting frequency band on the receiving side of the duplexer and further lowering the signal level at which its own transmitting wave is input to the receiving radio-frequency unit, can be considered. With these measures, however, the duplexer is excessively large, which may disturb miniaturization of the mobile terminal apparatus and the reduction of the weight thereof.

As described above, in the radio transmitter-receiver for simultaneously transmitting/receiving the radio signal having the amplitude variation components, such as the mobile terminal apparatus used in the CDMA cellular system, the interference to the receiving band, which results from the cross modulation between the near-field disturbance tone signal of the desired receiving wave and its own transmitting wave, occurs and therefore, some measures need to be taken. According to the conventionally considered measures, however, the standby time is shortened by increasing the consumed current of the receiving radio-frequency unit, and the radio transmitter-receiver is made larger by making the duplexer larger, and thus, the effective measures have been desired.

The present invention is accomplished in consideration of the above circumstances, and its object is to provide a radio receiver, a receiving radio-frequency unit thereof, and a control unit, capable of preventing deterioration of the receiving sensitivity caused by its own transmitting wave and the disturbance wave as well as restricting the increase in the current consumption of the receiving radio-frequency unit, and thus extending the standby time or communications time with preferable receiving distortion characteristics.

DISCLOSURE OF INVENTION

According to one aspect of the present invention, there is provided a radio transmitter-receiver for simultaneously transmitting/receiving a radio signal including an amplitude variation component, comprising: a receiving radio-frequency unit having a first operation mode in which an operation is executed at a predetermined first current consumption value and a predetermined first distortion characteristics, and a second operation mode in which an operation is executed at a second current consumption value larger than the first current consumption value and a second distortion characteristics having less distortion than the first distortion characteristics; and a mode changing control means allowing the receiving radio-frequency unit to be operated in the second operation mode in a period in which the radio signal is transmitted, or in the first operation mode in a period in which the radio signal is not transmitted.

Therefore, according to the present invention, since the receiving radio-frequency unit is operated in the low-distortion mode, in the period in which the radio signal is transmitted, the deterioration of the receiving sensitivity which is caused by the interference to the receiving band resulting from the cross modulation between the near disturbance wave of the desired receiving wave and its own transmitting wave, is suppressed, and the receiving distortion characteristics can be thereby kept preferable.

On the other hand, since the receiving radio-frequency unit is operated in the low current consumption mode, in the non-transmission period during which occurrence of the cross modulation as the standby period needs not to be considered, the current consumption of the receiving radio-frequency unit is reduced and thereby the standby time can be extended.

That is, according to the present invention, the standby time can be extended while the receiving distortion characteristics at the transmitting/receiving operation are kept preferable.

The receiving radio-frequency unit may comprise an amplification means for amplifying a signal received by an antenna, and the mode changing control means may change an operation mode of the amplification means.

Further, the receiving radio-frequency unit may comprise an amplification means for amplifying a signal received by an antenna and a mixer means for mixing the output from the amplification means and the receiving local oscillation signal, and mode changing control means may change the operation modes of the amplification means and the mixer means.

According to another aspect of the present invention, there is provided a radio transmitter-receiver wherein, where the radio transmitter-receiver transmits a radio signal intermittently, the mode changing control means allows the receiving radio-frequency unit to be operated in the second operation mode in a period in which intermittent transmission of the radio signal is being operated and a transmitting wave is transmitted actually, or in the first operation mode in a period in which the intermittent transmission of the radio signal is being operated and the transmission of the transmitting wave is stopped.

With this operation, even in the transmitting period, the receiving radio-frequency unit is operated at the low current consumption mode while the transmitting wave is not transmitted due to the intermittent transmission. For this reason, the period to operate in the low distortion mode in which the consumed current is comparatively large, is further shortened and thereby the average consumed current is further decreased, which allows the continuous communication time to be extended.

According to the other aspect of the present invention, there is provided a radio transmitter-receiver wherein the mode changing control means allows the receiving radio-frequency unit to be operated in the second operation mode in a period in which the radio signal is transmitted and a receiving level of the radio signal is lower than a predetermined threshold value, or in the first operation mode in a period in which the radio signal is transmitted and the receiving level of the radio signal is equal to or higher than a predetermined threshold value.

That is, a mobile terminal apparatus used in the CDMA cellular radio system generally employs what is called an open-loop control of the transmitting level, which allows the transmitting level of the upstream radio signal to be made higher when the receiving level of the downstream radio signal arriving from the base station is lowered. In a case where such a control is executed, the transmitting level of the upstream radio signal is made higher when the receiving level of the downstream radio signal is low, and therefore, the receiving distortion characteristics can be easily deteriorated because of the cross modulation. Thus, in this case, the receiving radio-frequency unit is operated in the low distortion mode. With this operation, the receiving distortion characteristics of the receiving radio-frequency unit can be kept preferable though the transmitting level is high.

On the other hand, the transmitting level of the upstream radio signal is set to be low when the receiving level of the downstream radio signal is high, and therefore, the receiving distortion characteristics caused by the cross modulation is hardly deteriorated. Thus, in this case, the receiving radio-frequency unit is operated in the low current consumption mode. With this operation, the average value of the consumed current of the receiving radio-frequency unit in the transmitting period is lowered and thereby the continuous communication period is extended.

According to the other aspect of the present invention, there is provided a radio transmitter-receiver wherein the mode changing control means allows the receiving radio-frequency unit to be operated in the second operation mode in a period in which the radio signal is transmitted and the transmitting level thereof is equal to or higher than a predetermined transmitting level, or in the first operation mode in a period in which the radio signal is transmitted and the transmitting level thereof is lower than the predetermined transmitting level.

With this structure, the receiving radio-frequency unit is operated in the low current consumption mode when the transmitting level is low, in a case of employing the aforementioned open-loop control is employed and, of course, in a case of employing the closed-loop control which allows the transmitting level of the upstream radio signal to be variably controlled in accordance with the instruction from the base station. For this reason, the average value of the consumed current of the receiving radio-frequency unit in the transmitting period is lowered and thereby the continuous communication period can be extended.

According to the other aspect of the present invention, there is provided a receiving radio-frequency unit wherein a first active circuit section being operated at a predetermined first current consumption value and a predetermined first distortion characteristics, and a second active circuit section having the same function as the first active circuit section, and being operated at a second current consumption value larger than the first current consumption value and a second distortion characteristics having less distortion than the first distortion characteristics, are provided in parallel; and a switching circuit section allows the second active circuit section to be operated selectively in a period in which the radio signal is transmitted, or allowing the first active circuit section to be operated selectively in a period in which the radio signal is not transmitted.

According to this structure, the receiving radio-frequency unit of the present invention can be implemented comparatively simply.

Each of the first and second active circuit sections may comprise an amplification means for amplifying the signal received by the antenna.

According to the other aspect of the present invention, there is provided a receiving radio-frequency unit wherein only one active circuit section having a predetermined radio signal receiving function is provided; and a bias supply switching circuit section supplies a first bias current allowing the active circuit section to be operated at a predetermined first current consumption value and a predetermined first distortion characteristics, in a period in which the radio signal is transmitted, and also supplies a second bias current allowing the active circuit section to be operated at a second current consumption value larger than the first current consumption value and a second distortion characteristics having less distortion than the first distortion characteristics, in a period in which the radio signal is not transmitted.

According to this structure, the active circuit of the receiving radio-frequency unit can be constituted in one system except for the bias circuit portion, which allows the structure of the receiving radio-frequency unit to be miniaturized.

The active circuit section may comprise the amplification means for amplifying a signal received by an antenna, and the bias supply changing circuit section may supply the first or second bias current to the amplification means.

In addition, an isolator may be provided between the active circuit section and a front-stage circuit for inputting the radio signal to the active circuit section. With this structure, the input impedance variation occurring together with the changing of the bias currents of the active circuit section can be prevented from bringing its influence to the front-stage circuit, by the isolator, and thereby the frequency characteristics of the front-stage circuit can be prevented from varying.

Further, in the radio transmitter-receiver employing the open-loop control of the transmitting level, where variation components caused by changing of the modes of the receiving radio-frequency unit, that is, changing of the active circuit and changing of the supply of the bias current is generated in the transmitting level control signal generated on the basis of the output signal level of the receiving radio-frequency unit during the above-mentioned open-loop transmission control, the variation components may be canceled by the variation suppressing means. With this structure, the variation in the transmitting level resulting from the gain variation of the active circuit in the receiving radio-frequency unit can be canceled, which allows the transmitting level error of the upstream radio signal to be reduced and also allows unnecessary current consumption in the transmitting radio-frequency circuit to be reduced.

According to the other aspect of the present invention, there is provided a radio transmitter-receiver wherein, in a case where the radio transmitter-receiver comprises the mode designation input means for allowing the user to designate and input the first operation mode of the low current consumption type and the second operation mode of the low distortion type in the receiving radio-frequency unit, when the mode is not designated by the mode designation input means, the receiving radio-frequency unit is operated in the second operation mode in a period in which the radio signal is transmitted, or in the first operation mode in a period in which the radio signal is not transmitted; and when the first or second operation mode is designated and input by the mode designation input means, the receiving radio-frequency unit is operated at any time in the designated and input operation mode.

According to the present invention, when the user designates, for example, the low current consumption mode, the receiving radio-frequency unit is always operated in the low current consumption mode and thereby usage can be selected while considering the extension of the communication period and the standby period with priority. This is effective when, for example, little capacitance remains in the battery of the radio transmitter-receiver. On the other hand, when the user designates, for example, the low distortion mode, the receiving radio-frequency unit is always operated in the low distortion mode, and thereby the user can use it by considering the communication quality with priority. This is effective when, for example, it is difficult to listen to the voice of the communication partner.

BEST MODE OF CARRYING OUT THE INVENTION (First Embodiment)

Figure 1:
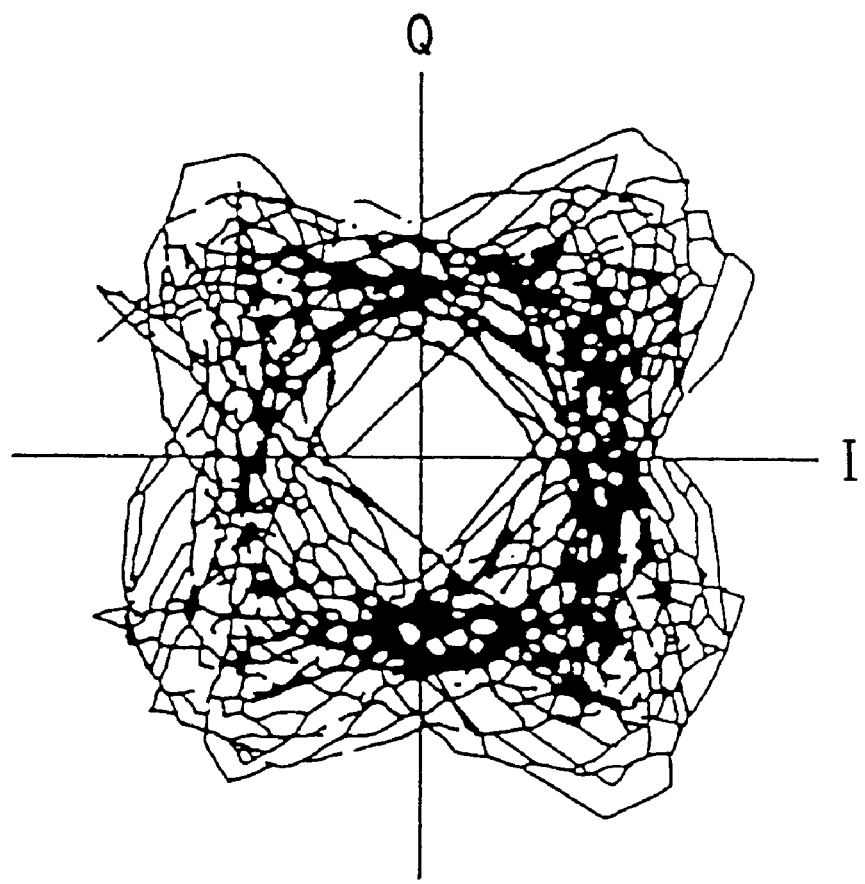
FIG. 1 is a diagram showing amplitude variation components included in a radio transmission signal of a CDMA mobile terminal apparatus.
Figure 2:
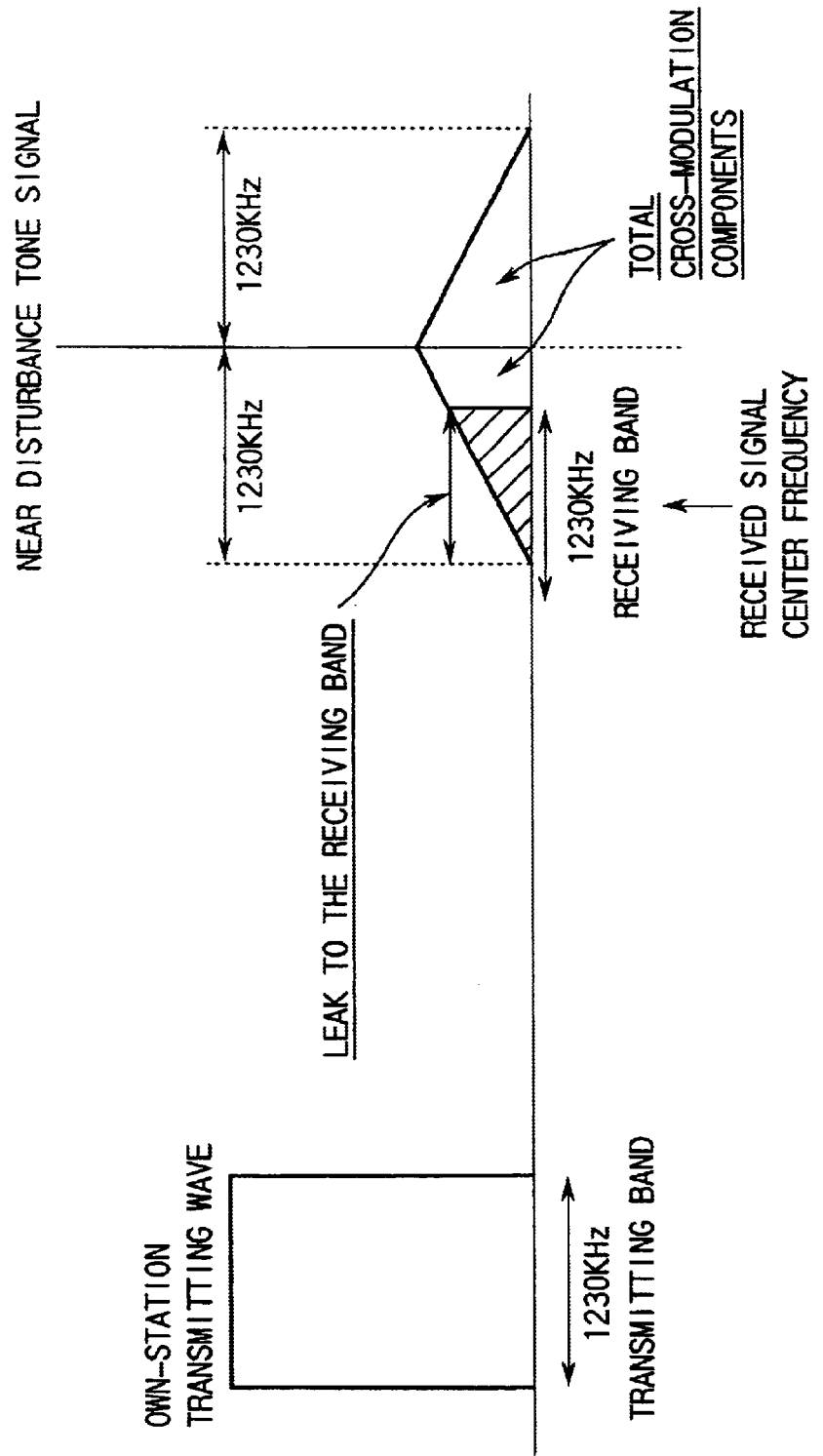
FIG. 2 is a diagram showing spectral characteristics to explain the problems of prior art.
Figure 3:
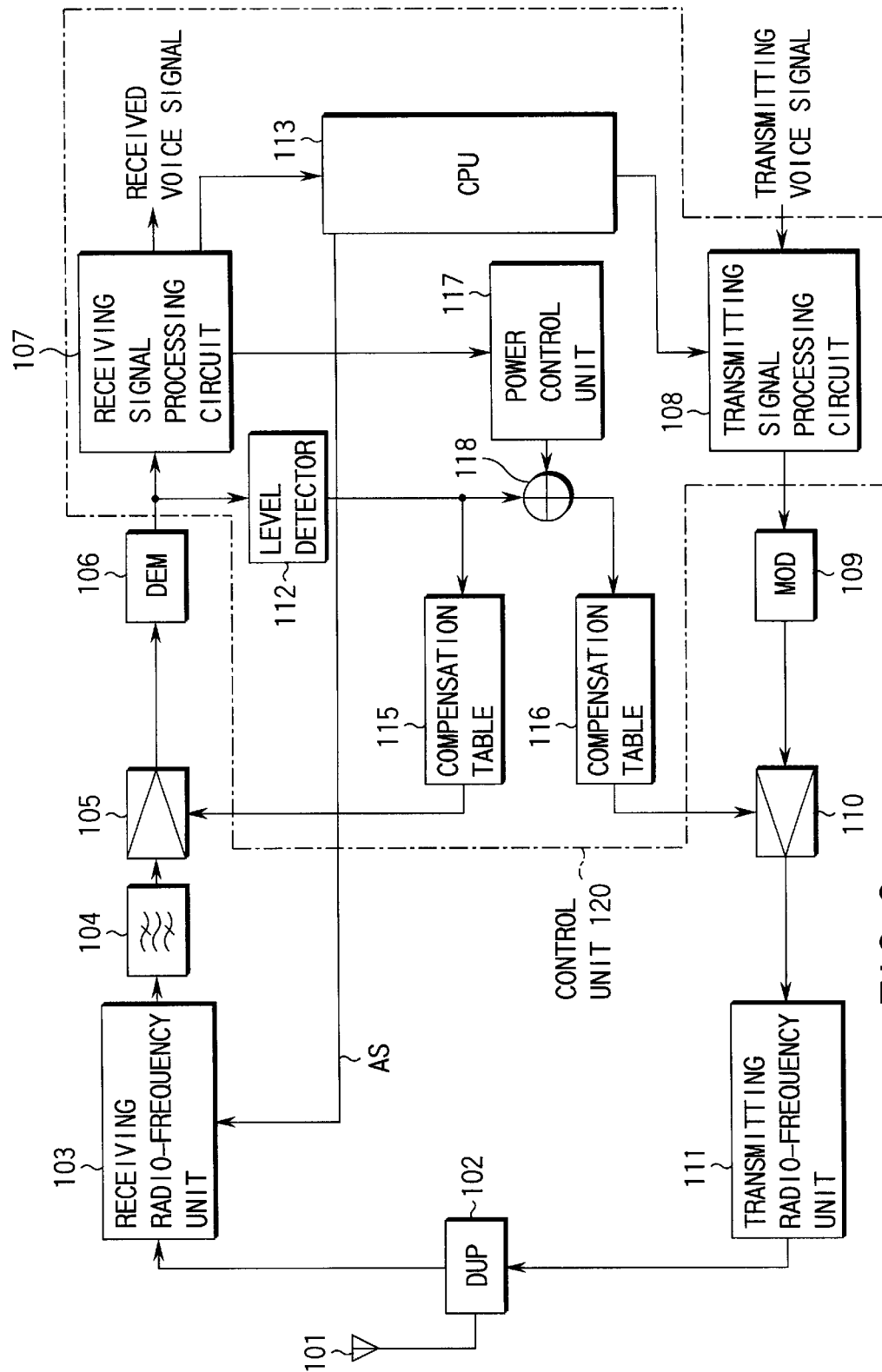
FIG. 3 is a block diagram showing a CDMA radio transmitter-receiver according to a first embodiment of the present invention.

FIG. 3 is a block diagram showing a CDMA radio transmitter-receiver for a mobile terminal apparatus, according to a first embodiment of the present invention.

In the figure, a radio frequency signal transmitted from a base station (not shown) is received by an antenna 101, and input to a receiving radio-frequency unit 103 serving as a receiving front end stage via a antenna duplexer (DUP) 102. In the receiving radio-frequency unit 103, the received radio frequency signal is subjected to the low noise amplification, removal of received unnecessary waves outside the receiving band, and frequency conversion into the receiving intermediate frequency. Unnecessary waves near desired signals are removed from the receiving intermediate frequency signal by an intermediate frequency filter 104. Further, the receiving intermediate frequency signal is adjusted to be a signal level suitable for the demodulating process of a latter stage by a receiving variable-gain amplifier 105, orthogonally demodulated by an orthogonal demodulator (DEM) 106 and is output as a received baseband signal.

The received baseband signal is input to a receiving signal processing circuit 107 in a control unit 120. The received baseband signal is subjected to the received signal processing such as the spectrum despreading using a PN code, error correction decoding, voice decoding, and the like, and is output as a received voice signal.

On the other hand, a transmitting voice signal is subjected to the transmitting signal processing such as voice encoding, error correction encoding, spectrum spreading using a PN code and the like, in a transmitting signal processing circuit 108 in the control unit 120, orthogonally modulated by an orthogonal modulator (MOD) 109 and output as a transmitting intermediate frequency signal. The transmitting intermediate frequency signal is amplified at a desired level by a transmitting variable-gain amplifier 110 and is input to a transmitting radio-frequency circuit 111 as a transmitting front-end stage. In the transmitting radio-frequency circuit 111, the transmitting intermediate frequency signal is subjected to the frequency conversion into a radio frequency, removal of unnecessary signals outside the transmitting band, and power amplification. The transmitting radio frequency signal which is output from the transmitting radio-frequency circuit 111 is transmitted from the antenna 101 to a base station (not shown) via the duplexer 102.

A central processing unit (CPU) 113 and a variable-gain control circuit are provided besides the receiving signal processing circuit 107 and the transmitting signal processing circuit 108, in the control unit 120.

The variable-gain control circuit detects the signal level of the received baseband signal which is output from the orthogonal demodulator 106, by a level detector 112, and supplies the value of detection to the receiving variable-gain amplifier 105 as a gain control signal to control its gain, so that the signal level of the receiving intermediate frequency signal which is input to the orthogonal demodulator 106 can be constant at a desired level.

The gain control signal is also used to control the gain of the transmitting variable-gain amplifier 110. This control system is designed to execute the open loop control of the transmitting power. When the own apparatus is remote from the base station and the received signal level is lowered, the transmitting power level is controlled to be increased by this control system so that the upstream signal power level transmitted to the base station can be constant.

A power control signal to be output from a power control circuit 117 is added to the gain control signal for open loop control, in the adder 118. This control system, which is designed to provide the closed loop control of the transmitting power, takes the power control bit transmitted from the base station at the receiving signal processing circuit 107, generates the power control signal equivalent to the increase or decrease of 1 dB step at the power control circuit 117 in accordance with the value (0 or 1) of the power control bit, and adds the power control signal to the gain control signal for open loop control as explained above, so as to control the transmitting power variably. With the closed loop control, an error of the open loop transmitting power control which is generated by non-correlation of fading between the downstream line and the upstream line, is compensated.

Reference numerals 115 and 116 denote compensation tables for compensating for the non-linearity of the receiving variable-gain amplifier 105 and that of the transmitting variable-gain amplifier 106, respectively.

Figure 4:
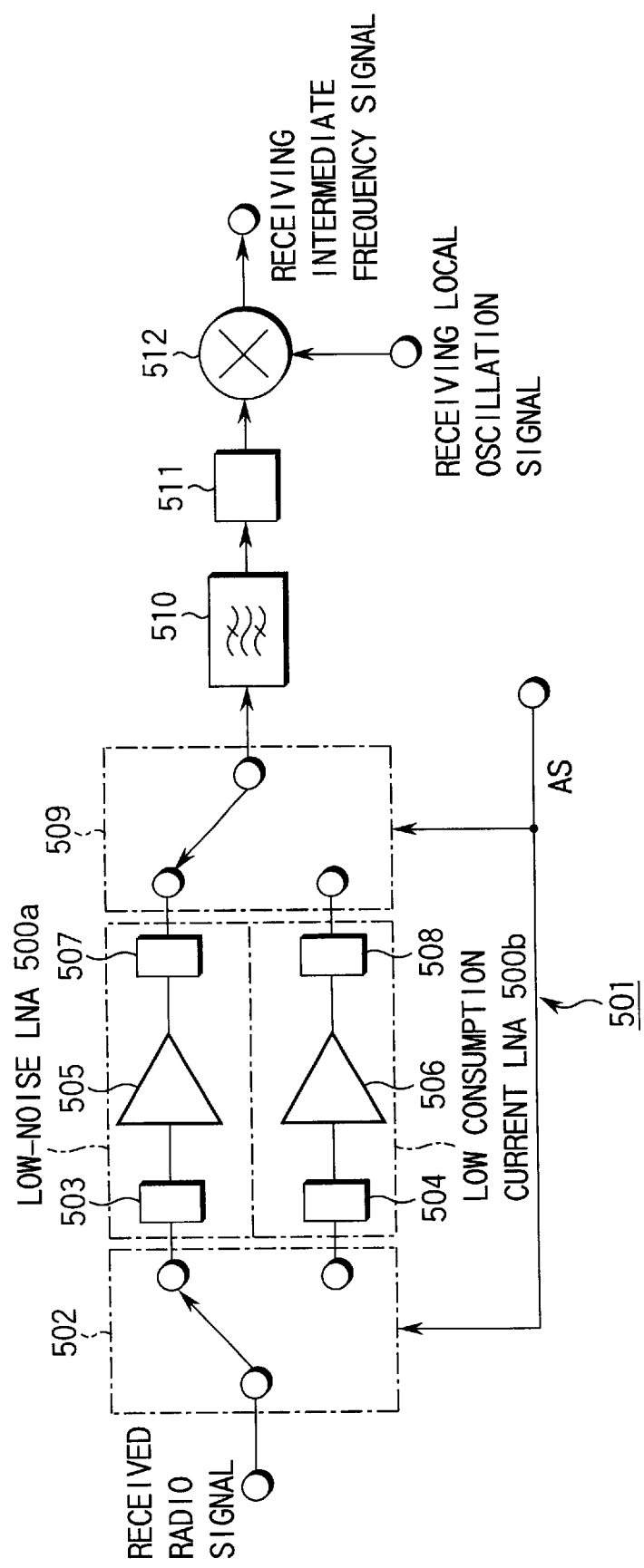
FIG. 4 is a block diagram showing a configuration of a receiving radio-frequency unit of the CDMA radio transmitter-receiver shown in FIG. 3.

The receiving radio-frequency unit 103 has the low distortion operation mode and the low current consumption mode and is constituted, for example, in the following manner. FIG. 4 is a block diagram showing the configuration of the receiving radio-frequency unit 103.

That is, the receiving radio-frequency unit 103 comprises a low noise amplification circuit section 501, an interstage filter 510, a matching circuit 511 and a mixer 512. The low noise amplification circuit section 501 is constituted by a low noise amplifier (low distortion LNA) 500a having low distortion characteristics, a low noise amplifier (low current consumption LNA) 500b of the low current consumption type, and radio-frequency switches 502 and 509 made, for example, in the GaAsFET process.

The low distortion LNA 500a is constituted by a matching circuit 503, an amplifier 505 and a matching circuit 507, and implements the low distortion characteristics by a supplying comparatively large bias to the amplifier 505. The low current consumption LNA 500b is also constituted by a matching circuit 504, an amplifier 506 and a matching circuit 508, but achieves the low current consumption characteristics by lowering the bias current of the amplifier 506 rather than the low distortion LNA 500a.

On the other hand, the CPU 113 in the control unit 120 has a receiving operation mode change control function according to the present invention, in addition to a general control function associated with the CDMA communication operation with the base station. This receiving operation mode change control function determines whether the operation state of the radio transmitter-receiver is the transmitting/receiving state or the standby state.

The low distortion LNA 500a is selected during the period of the transmitting/receiving state. On the other hand, during the period of the standby state, an LNA switch control signal AS for selection of the low current consumption LNA 500b is generated and supplied to the radio-frequency switches 502 and 509 of the low noise amplification circuit section 501.

Next, the operations of the above-constituted radio transmitter-receiver will be explained.

First, in the standby state, an LNA switch control signal AS for selection of the low current consumption LNA 500b is output from the CPU 113. For this reason, both the radio-frequency switches 502 and 509 are switched to the low current consumption LNA 500b side, in the low noise amplification circuit section 501 within the receiving radio-frequency unit 103. Therefore, in the standby state, the receiving radio-frequency unit 103 executes the standby receiving operation by the low current consumption LNA 500b. As a result, the consumed current at the standby time is reduced, rather than a case where the low distortion LNA 500a is used at any time. For this reason, the standby time of the radio transmitter-receiver can be extended.

Next, when the radio transmitter-receiver becomes in the transmitting and receiving state in accordance with transmission and reception, the LNA switch control signal AS for selection of the low distortion LNA 500a is output from the CPU 113. For this reason, both the radio-frequency switches 502 and 509 are switched to the low distortion LNA 500a side, in the low noise amplification circuit section 501 within the receiving radio-frequency unit 103. Therefore, in the transmitting and receiving state, the receiving radio-frequency unit 103 executes the receiving operation by the low distortion LNA 500a. As a result, deterioration of the receiving sensitivity which is caused by the interference to the receiving band resulting from the cross modulation between the near disturbance wave of the desired receiving wave and its own transmitting wave, is suppressed, and the receiving distortion characteristics can be thereby kept preferable.

(Second Embodiment)

According to a second embodiment of the present invention, when the apparatus has a transmitting mode for intermittently burst-transmitting a transmitting radio wave in accordance with the transmission bit rate, switching between the low distortion LNA and the low current consumption LNA in the receiving radio-frequency unit is executed by using a transmission timing control signal which is output to the transmitting radio-frequency circuit by the control unit, for the intermittent transmission control.

Figure 5:
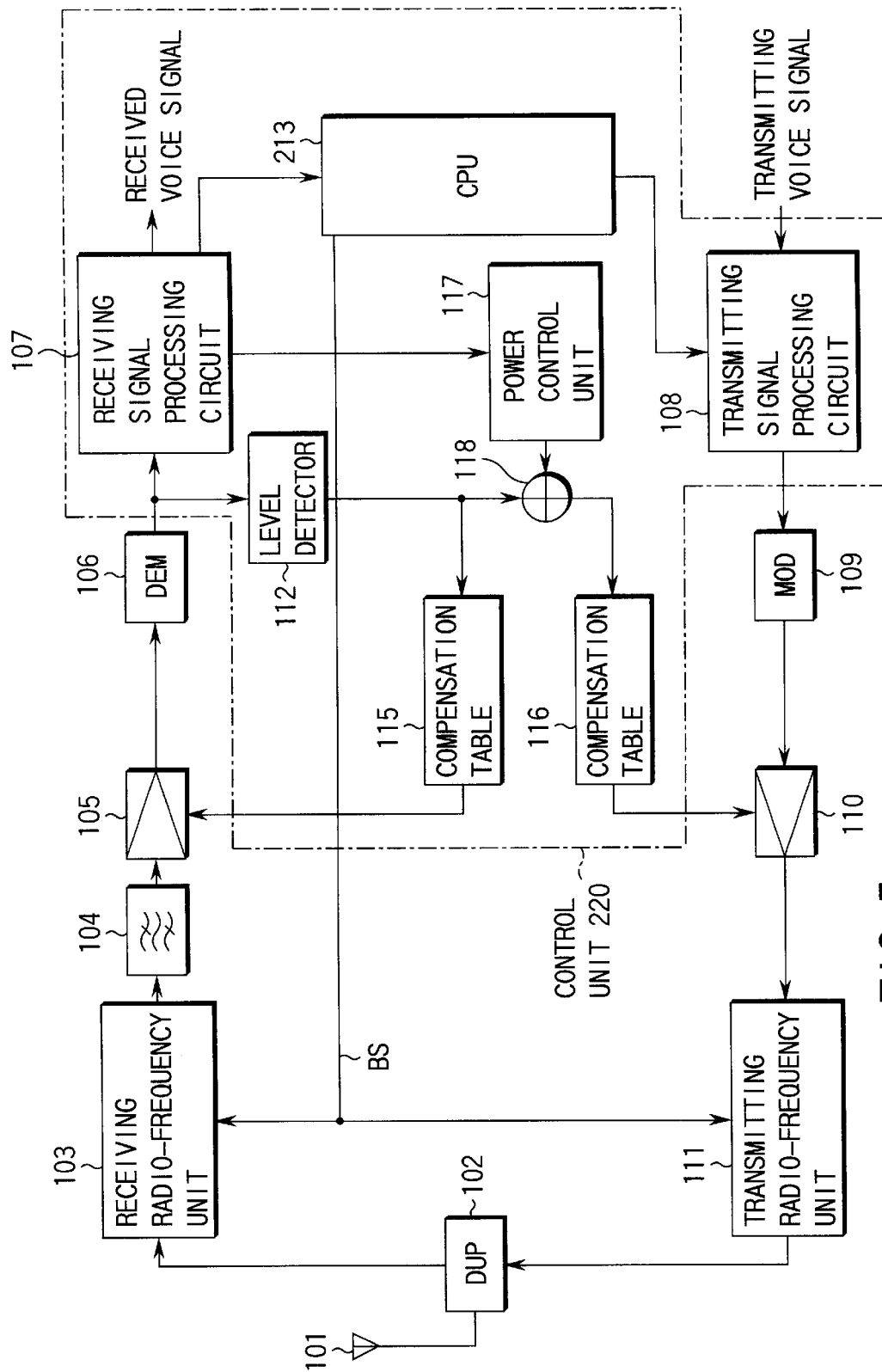
FIG. 5 is a block diagram showing a CDMA radio transmitter-receiver according to a second embodiment of the present invention.

FIG. 5 is a block diagram showing a configuration of a radio transmitter-receiver according to a second embodiment. In this figure, the same portions as those of FIG. 3 are denoted by the same reference numerals, and their explanation is omitted.

Generally, a CDMA radio transmitter-receiver provides the variable rate coding for varying the encoding rate in accordance with the state of a speaker's voice, for example, whether a speaker speaks fast or slowly, whether during transmission or reception, or the like. In addition, the upstream radio signal is burst-transmitted intermittently, in accordance with the data rate based on the variable rate coding. For example, when the data rate is 9600 bps, the signal is transmitted at any time. When the data rate is 4800 bps or 2400 bps, the signal is burst-transmitted intermittently at a time interval according to the data rate.

At this time, in order to provide the intermittent transmission of the upstream radio signal, a CPU 213 in a control unit 220 generates a transmission timing control signal BS representing the ON/OFF timing of the transmission, so that a transmission power amplifier in the transmitting radio-frequency circuit 111 can be turned ON/OFF in accordance with the transmission timing control signal BS.

Thus, the radio transmitter-receiver of the present embodiment supplies the transmission timing control signal BS generated from the CPU 213 to the receiving radio-frequency unit 103 as an LNA switch control signal.

When the transmission timing control signal BS is OFF, both the radio-frequency switches 502 and 509 are switched to the low current consumption LNA 500b side, in the receiving radio-frequency unit 103. On the other hand, when the transmission timing control signal BS is ON, both the radio-frequency switches 502 and 509 are switched to the low distortion LNA 500a side, in the receiving radio-frequency unit 103.

With this configuration, in the standby state, both the radio-frequency switches 502 and 509 are switched to the low current consumption LNA 500b side, in the receiving radio-frequency unit 103, since the transmission timing control signal BS is OFF. Therefore, in the standby state, the receiving radio-frequency unit 103 executes the standby receiving operation with the low current consumption LNA 500b.

On the other hand, in the transmitting/receiving state, the CPU 213 outputs the transmission timing control signal BS which is ON/OFF in accordance with the intermittent transmission timing of the upstream radio signal. In the transmitting radio-frequency circuit 111, the operation of the transmitting power amplifier becomes ON/OFF in synchronization with the control signal BS.

At the same time, in the receiving radio-frequency unit 103, the radio-frequency switches 502 and 509 are switched between the low distortion LNA 500a side and the low current consumption LNA 500b side, in synchronization with the ON/OFF state of the transmission timing control signal BS. For this reason, even in the transmitting/receiving state, the low distortion LNA 500a is used in an only period when the upstream radio signal is actually transmitted, and the low current consumption LNA 500b is used in an intermittent transmission interruption period. Therefore, the average value of the current consumption of the receiving radio-frequency unit 103 during the transmitting/receiving period is further reduced.

As a result, the average value of the consumed current at the standby time can be further reduced, and thereby the continuous communication time of the radio transmitter-receiver can be extended, rather than a case where the low distortion LNA 500a is used at any time in the transmitting/receiving operation period as described previously in the first embodiment.

(Third Embodiment)

A third embodiment of the present invention is an improvement of the above-described second embodiment. The receiving level of the downstream radio signal transmitted from the base station is determined by using the gain control signal for the open-loop transmission power control. The low distortion LNA is selected during the upstream radio signal burst-transmitting period and in a case where the receiving level of the downstream radio signal is lower than a threshold value. On the other hand, even in the upstream radio signal burst-transmitting period, when the receiving level of the downstream radio signal is equal to or higher than a threshold value, the receiving radio-frequency unit is switched so as to select the low current consumption LNA.

Figure 6:
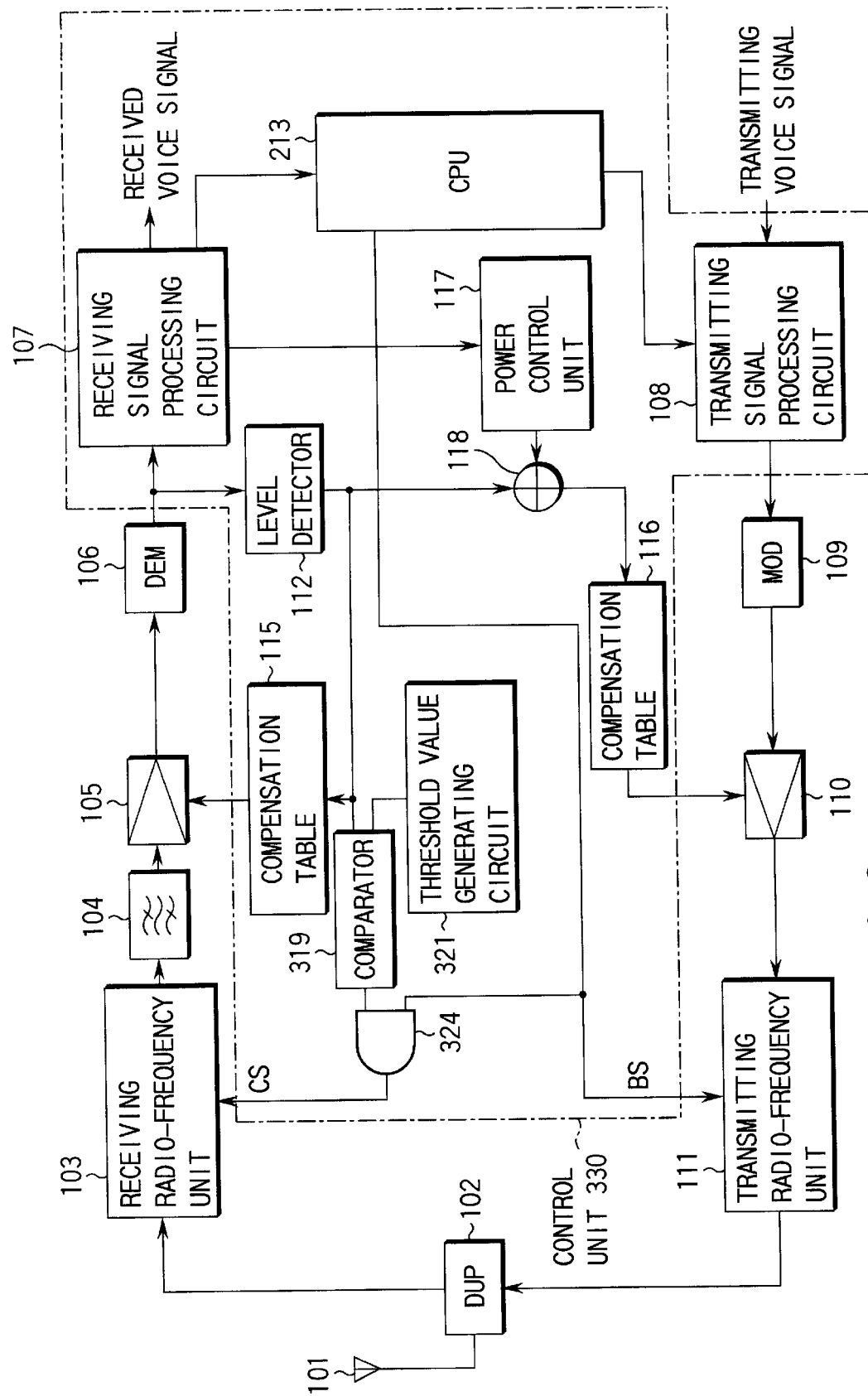
FIG. 6 is a block diagram showing a CDMA radio transmitter-receiver according to a third embodiment of the present invention.

FIG. 6 is a block diagram showing a radio transmitter-receiver according to the third embodiment. In this figure, the same portions as those shown in FIG. 5 are denoted by the same reference numerals and their detailed explanation will be omitted.

In a control unit 330, the gain control signal which is output from the level detector 112 is supplied to the receiving variable-gain amplifier 105 via the compensation table 115 and is also input to a comparator 319. The comparator 319 compares the level of the gain control signal with a threshold value generated from a threshold value generating circuit 321 and inputs its determination signal to an AND gate 324. The AND gate 324 provides the AND process about the transmission timing control signal BS which is output from the CPU 213 and a receiving level determination signal which is output from the comparator 319, and supplies the AND output to the receiving radio-frequency unit 103 as an LNA switch control signal CS.

When the LNA switch control signal CS is OFF, both the radio-frequency switches 502 and 509 are switched to the low current consumption LNA 500b side, in the receiving radio-frequency unit 103. On the other hand, when the LNA switch control signal CS is ON, both the radio-frequency switches 502 and 509 are switched to the low distortion LNA 500a side, in the receiving radio-frequency unit 103.

In this configuration, since the transmission timing control signal BS is OFF in the standby state, both the radio-frequency switches 502 and 509 are switched to the low current consumption LNA 500b side, in the receiving radio-frequency unit 103. Therefore, in the standby state, the receiving radio-frequency unit 103 executes the standby receiving operation with the low current consumption LNA 500b.

On the other hand, in the transmitting/receiving state, the transmission timing control signal BS which is ON or OFF in accordance with the intermittent transmission timing of the upstream signal is output from the CPU 213. In accordance with the transmission timing control signal BS, the transmitting power amplifier of the transmitting radio-frequency circuit 111 becomes in the operation state in the only ON period of the transmission timing control signal BS, and as a result the upstream radio signal is burst-transmitted.

On the other hand, in the receiving radio-frequency unit 103, switching between the low distortion LNA 500a and the low current consumption LNA 500b is executed in accordance with the LNA switch control signal CS generated on the basis of both the transmission timing control signal BS and the receiving level determination signal which is output from the comparator 319.

That is, it is assumed now that, for example, the radio transmitter-receiver exists in a fringe area of a cell which the base station forms. In this case, since the base station is far from the radio transmitter-receiver, the receiving level of the downstream radio signal is lowered in the radio transmitter-receiver. Then, the gain control signal of a higher level is output from the level detector 112 to compensate for the lowering of the receiving level. If the gain control signal exceeds the threshold value, the AND gate 324 becomes continuity and the transmission timing control signal BS is supplied to the receiving radio-frequency unit 103, as it is, as the LNA switch control signal CS. For this reason, in the receiving radio-frequency unit 103, both the radio-frequency switches 502 and 509 are switched between the low distortion LNA 500a side and the low current consumption LNA 500b side in synchronization with the ON/OFF state of the transmission timing control signal BS and thereby the low distortion LNA 500a is selected and used during the period in which the upstream radio signal is burst-transmitted.

On the other hand, when the radio transmitter-receiver exists at a position which is not so remote from the base station, for example, the receiving level of the downstream radio signal at the radio transmitter-receiver becomes high adequately. Thus, the level of the gain control signal which is output from the level detector 112 becomes lower and does not exceed the threshold value. For this reason, the AND gate 324 becomes non-continuity and, as a result, the transmission timing control signal BS does not pass through the AND gate 324 or the LNA switch control signal CS is not supplied to the receiving radio-frequency unit 103. Thus, the low current consumption LNA 500b is always used in the receiving radio-frequency unit 103.

As described above, in the third embodiment, even during the ON period of the transmission timing control signal BS, i.e. during the period in which the upstream radio signal is actually transmitted, the low distortion LNA 500a is used in the receiving radio-frequency unit 103 only when the receiving level of the downstream radio signal received from the base station is lower than the threshold value. In other cases, i.e. during the intermittent transmission interruption period of the upstream radio signal or in a case where the receiving level of the downstream radio signal is equal to or higher than the threshold value, the low current consumption LNA 500b is used.

Therefore, even in a case where the receiving level of the downstream radio signal is low and, in accordance with this, the transmitting power level of the upstream radio signal is set to be high, the deterioration of the receiving sensitivity caused by the interference of both the transmitting wave and the disturbance wave is suppressed to be smaller since the low distortion LNA 500a is used in the receiving radio-frequency unit 103.

On the other hand, in a case where the receiving level of the downstream radio signal is high and, in accordance with this, the transmitting power level of the upstream radio signal is set to be low, the low current consumption LNA 500b is used in the receiving radio-frequency unit 103 even during the period in which the upstream radio signal is burst-transmitted.

For this reason, the average value of the current consumption in the receiving radio-frequency unit 103 in the transmitting/receiving state can be further reduced and thereby the communication time can be further extended, as compared with the above-described second embodiment.

(Fourth Embodiment)

A fourth embodiment of the present invention is another improvement of the second embodiment. The transmitting level of the upstream radio signal transmitted to the base station is determined by using the gain control signal for the closed-loop transmission power control. The receiving radio-frequency unit is controlled to switch such that the low distortion LNA is selected during the upstream radio signal burst-transmitting period, in a case where the receiving level of the upstream radio signal is equal to or higher than a threshold value, on the other hand, even in the upstream radio signal burst-transmitting period, when the receiving level of the upstream radio signal is lower than a threshold value, the low current consumption LNA is selected.

Figure 7:
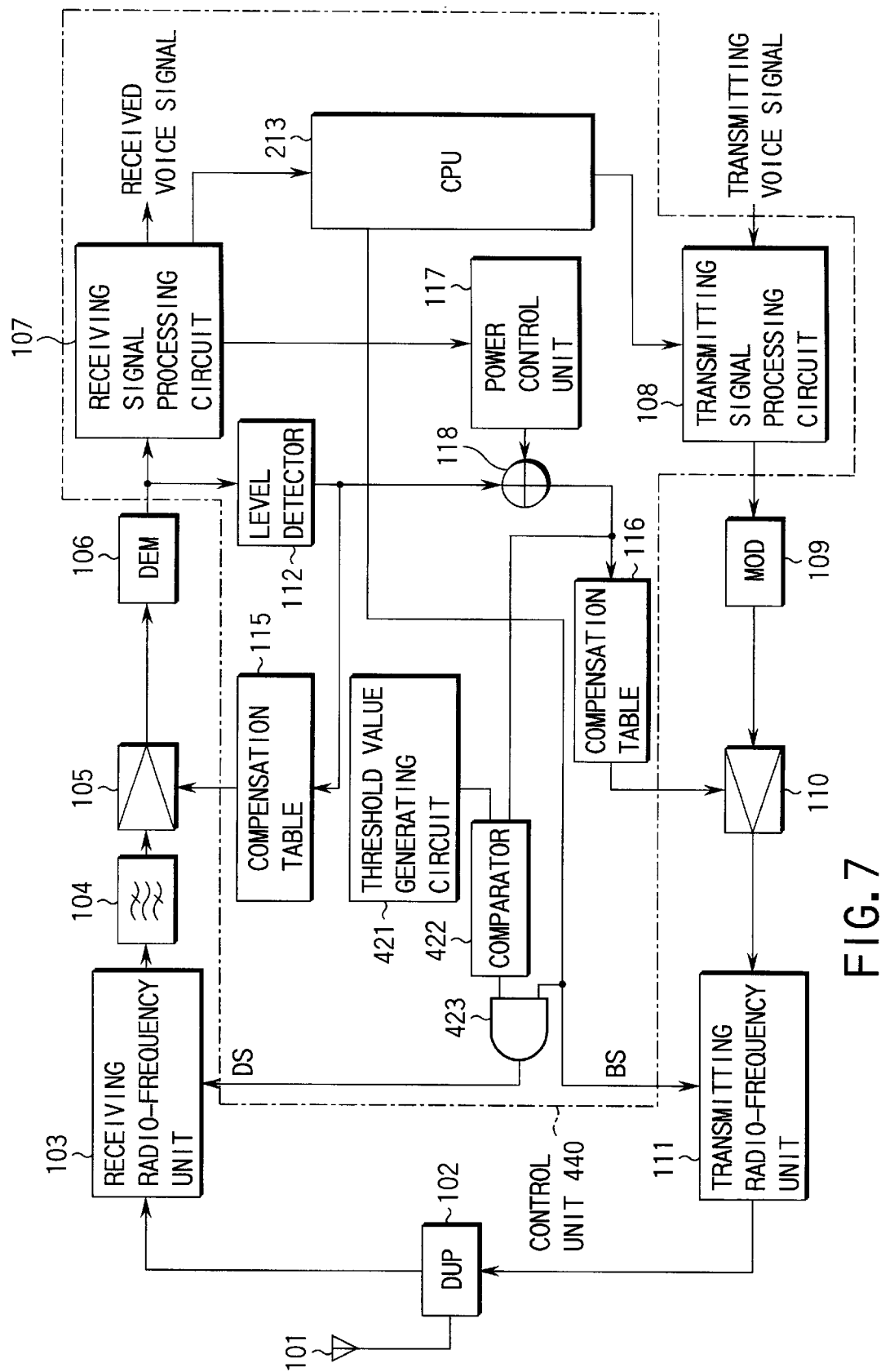
FIG. 7 is a block diagram showing a CDMA radio transmitter-receiver according to a fourth embodiment of the present invention.

FIG. 7 is a block diagram showing a radio transmitter-receiver according to the fourth embodiment. In this figure, the same portions as those shown in FIG. 5 are denoted by the same reference numerals and their detailed explanation will be omitted.

In a control unit 440, the gain control signal for closed-loop control which is output from the adder 118 is supplied to the transmitting variable-gain amplifier 110 via the compensation table 116 and is also input to a comparator 422. The comparator 422 compares the level of the gain control signal with a threshold value generated from a threshold value generating circuit 421 and inputs its determination signal to an AND gate 423. The AND gate 423 provides the AND process about the transmission timing control signal BS which is output from the CPU 213 and a transmitting level determination signal which is output from the comparator 422, and supplies the AND output to the receiving radio-frequency unit 103 as an LNA switch control signal DS.

When the LNA switch control signal DS is OFF, both the radio-frequency switches 502 and 509 are switched to the low current consumption LNA 500b side, in the receiving radio-frequency unit 103. On the other hand, when the LNA switch control signal DS is ON, both the radio-frequency switches 502 and 509 are switched to the low distortion LNA 500a side, in the receiving radio-frequency unit 103.

With this configuration, in the transmitting/receiving state, for example, when the transmitting power level is set to be a large value, such a case where the radio transmitter-receiver exists in a fringe area of a cell which the base station forms, i.e. a case where the radio transmitter-receiver is far from the base station, the AND gate 423 becomes continuity since the gain control signal which is output from the adder 118 exceeds the threshold value. For this reason, the transmission timing control signal BS which is output from the CPU 213 is supplied to the receiving radio-frequency unit 103, as it is, as the LNA switch control signal DS. Therefore, at this time, in the receiving radio-frequency unit 103, the low distortion LNA 500a is selected and used by the radio-frequency switches 502 and 509. For this reason, even if the upstream radio signal of a high transmitting power level is transmitted, deterioration of the receiving sensitivity caused by the interference from both the transmitting wave and the disturbance wave can be suppressed to be low.

On the other hand, for example, when the radio transmitter-receiver exists at a position which is not so remote from the base station, the receiving level of the downstream radio signal in the radio transmitter-receiver becomes high adequately. Thus, the level of the gain control signal which is output from the adder 118 becomes lower and does not exceed the threshold value. For this reason, the AND gate 423 becomes non-continuity and, as a result, the transmission timing control signal BS does not pass through the AND gate 423 or the LNA switch control signal CS is not supplied to the receiving radio-frequency unit 103. Thus, the low current consumption LNA 500b is always used in the receiving radio-frequency unit 103, even during the burst-transmission of the upstream radio signal.

Therefore, the average value of the current consumption in the receiving radio-frequency unit 103 in the transmitting/receiving state can be further reduced and thereby the communication time can be further extended, as compared with the above-described second embodiment.

In addition, in the fourth embodiment, since the transmitting power level is determined in accordance with the gain control signal for closed-loop transmission power control to which the power control signal is added at the adder 118, and also the switching of the LNA is controlled, an appropriate response can be made when the transmitting power level of the upstream radio signal is increased in accordance with an instruction of the base station to increase the transmitting power.

(Fifth Embodiment)

According to a fifth embodiment of the present invention, the low distortion LNA 500a and the low current consumption LNA 500b are not arranged in parallel as shown in FIG. 4, but the bias circuit is modified so that a single LNA can be operated in the low distortion mode or the low current consumption mode by changing the bias current, in the receiving radio-frequency unit.

Figure 8:
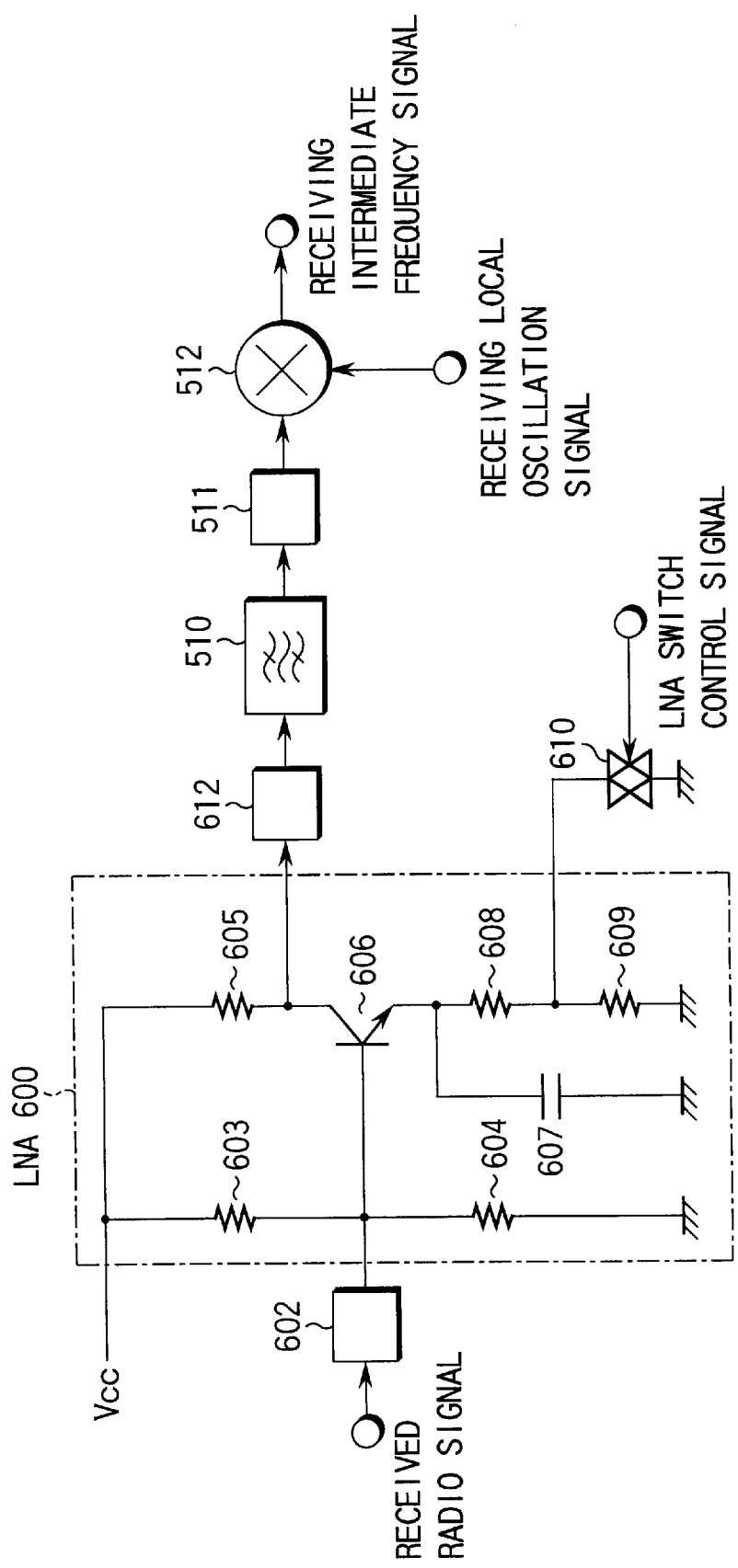
FIG. 8 is a block diagram showing a receiving radio-frequency unit in a CDMA radio transmitter-receiver according to a fifth embodiment of the present invention.

FIG. 8 is a block diagram showing a configuration of a receiving radio-frequency unit according to the fifth embodiment. In this figure, the same portions as those in FIG. 4 are denoted by the same reference numerals and their explanation will be omitted.

In FIG. 8, the downstream radio signal which is output from a duplexer is input to an LNA 600 via a matching circuit 602, low-noise-amplified in the LNA 600, input to a mixer 512 via a matching circuit 612, the interstage filter 510 and the matching circuit 511, mixed with the receiving local oscillation signal to convert it into a receiving intermediate frequency signal.

In the LNA 600, a transistor 606, resisters 603, 604, 605, 608 and 609 and a capacitor 607 are connected as shown in the figure. A switch 610 is connected to a node between the emitter resisters 608 and 609 of the transistor 606. The switch 610 is turned on or off in accordance with the LNA switch control signal supplied from the control unit.

In this configuration, when the LNA switch control signal of 'H' level to designate the low distortion operation mode is output from the control unit, the switch 610 is turned on so as to connect the only emitter resister 608 to the transistor 606, and thereby the bias current of the transistor 606 is increased. For this reason, the LNA 600 is operated in the low distortion operation mode.

On the other hand, when the LNA switch control signal of 'L' level to designate the low current consumption operation mode is output from the control unit, the switch 610 is turned off so as to connect a series circuit of the emitter resisters 608 and 609 to the transistor 606, and thereby the bias current of the transistor 606 is decreased. For this reason, the LNA 600 is operated in the low current consumption operation mode.

With this configuration, the circuit can be made smaller than the circuit shown in FIG. 4. In addition, since the direct-current bias switching scheme is employed, the radio-frequency current does not flow to the switch 610 and, for this reason, an inexpensive low-frequency semiconductor switch element such as a CMOS transistor, a bipolar transistor and the like can be used.

(Sixth Embodiment)

Figure 9:
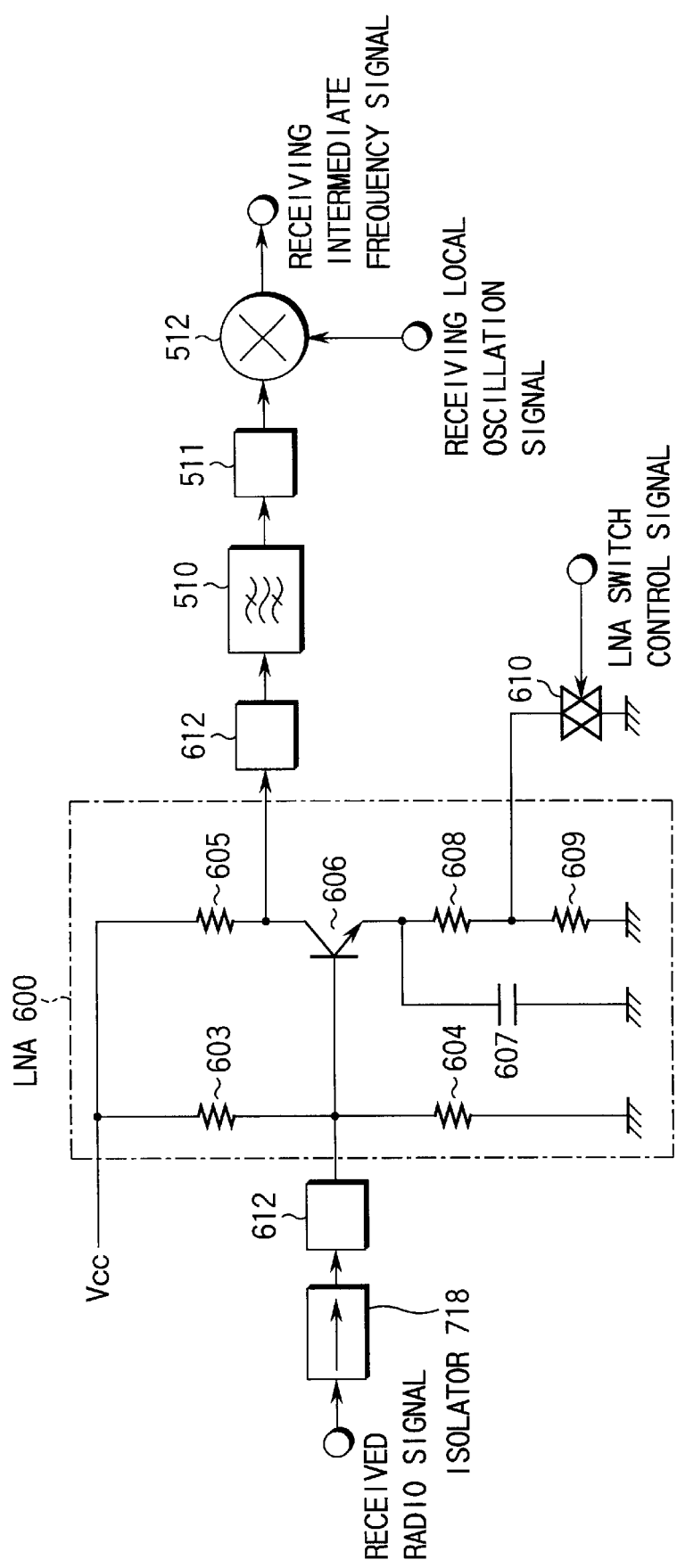
FIG. 9 is a block diagram showing a receiving radio-frequency unit in a CDMA radio transmitter-receiver according to a sixth embodiment of the present invention.

According to a sixth embodiment of the present invention, as shown in FIG. 9, an isolator 718 is provided between the input side of the LNA 600 in the bias changing type described in the fifth embodiment and a duplexer (not shown). Even if the bias changing executed by the LNA 600 allows its input impedance to be varied, its influence is not applied to the duplexer, by the isolator 718.

With this configuration, the variation in the input impedance occurring together with the bias changing of the LNA 600 is interrupted by the isolator 718 and does not influence the duplexer at its front stage. For this reason, the deterioration in the frequency characteristics (ripples in the receiving band and the attenuation characteristics outside the receiving band) of the duplexer can be suppressed to the minimum.

(Seventh Embodiment)

According to a seventh embodiment of the present invention, in a radio transmitter-receiver using the LNA 600 of the bias changing type described in the fifth embodiment for the receiving radio-frequency unit, the influence of the gain variation occurring together with the bias changing of the LNA 600 is prevented from applying to the transmitting power level of the upstream radio signal via an opened-loop control circuit for the transmitting power, by providing a correction circuit of the gain control signal inside the opened-loop control circuit for the transmitting power.

Figure 10:
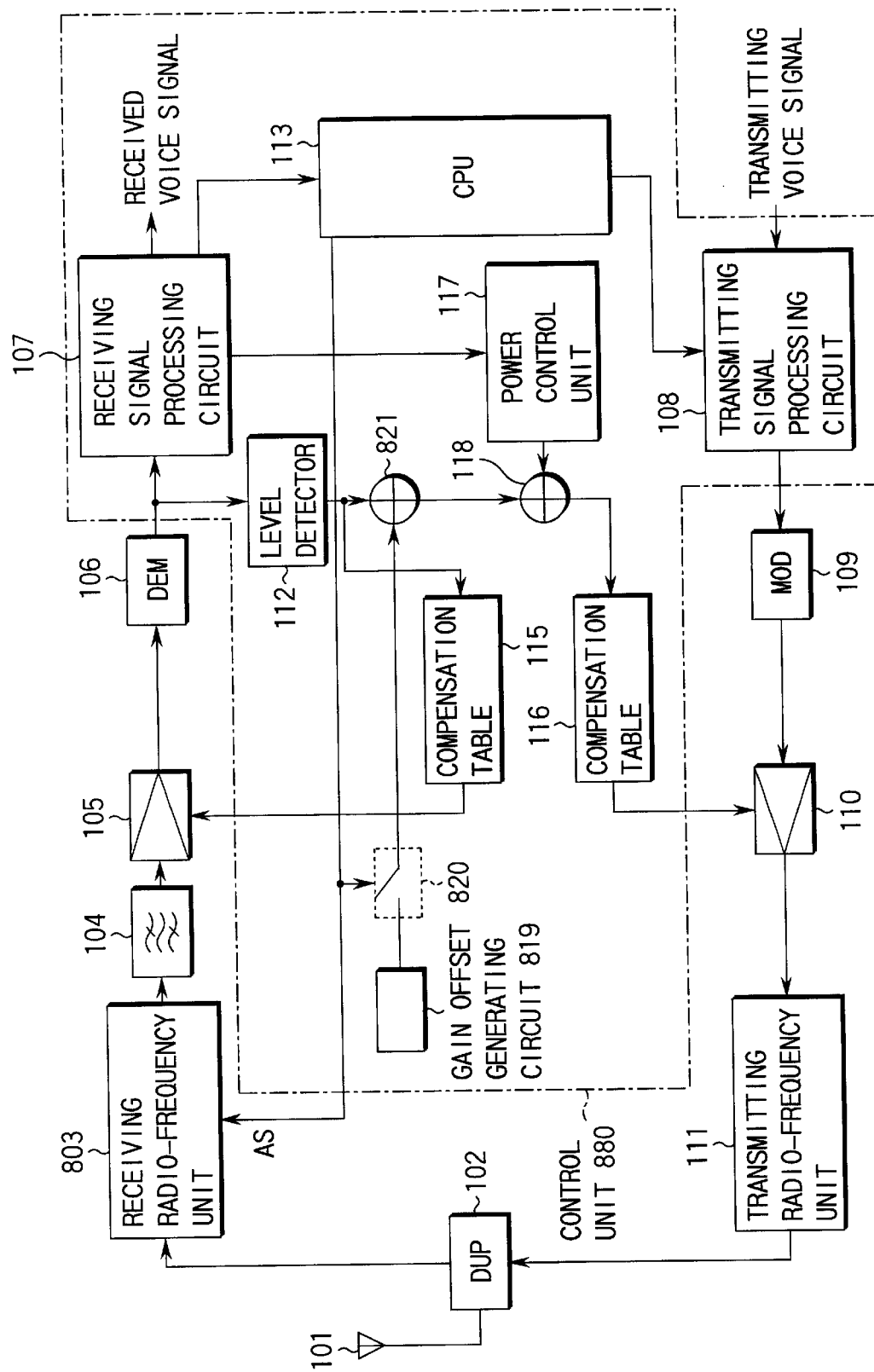
FIG. 10 is a block diagram showing a CDMA radio transmitter-receiver according to a seventh embodiment of the present invention.

FIG. 10 is a block diagram showing a configuration of a radio transmitter-receiver according to the seventh embodiment of the present invention. In the figure, the same portions as those shown in FIG. 3 are denoted by the same reference numerals, and their explanation will be omitted.

A receiving radio-frequency unit 803 is constituted by a circuit having the LNA 600 of the bias changing type shown in FIG. 8. That is, in the receiving radio-frequency unit 803, when the LNA switch control signal AS of 'H' level that designates the low distortion operation mode is output from the CPU 113, the switch 610 is turned on so that the only emitter resister 608 is connected to the transistor 606, and thereby the bias current of the transistor 606 is increased. Thus, the LNA 600 is operated in the low distortion operation mode.

On the other hand, when the LNA switch control signal AS of 'L' level that designates the low current consumption operation mode is output from the CPU 113, the switch 610 is turned off so that the series circuit of the emitter resisters 608 and 609 is connected to the transistor 606, and thereby the bias current of the transistor 606 is decreased. Thus, the LNA 600 is operated in the low current consumption operation mode.

Incidentally, when the operation mode of the LNA 600 is set by the changing of the bias current in this manner, the gain of the LNA 600 is varied in the low distortion operation mode or the low current consumption mode. Thus, the receiving level of the downstream radio signal cannot be estimated exactly in the opened-loop transmission power control circuit by the gain variation and, as a result, the transmitting power of the upstream radio signal cannot be controlled correctly.

For example, it is assumed that the gain is G1 [dB] in the low current consumption operation mode and G2 [dB] in the low distortion operation mode. Although the receiving level of the downstream radio signal is not varied, the transmitting power level is varied step-by-step by the gain difference G2−G1 [dB].

In the seventh embodiment, a circuit for correcting the gain control signal for the opened-loop transmission power control is provided in a control unit 880. This correction circuit is constituted by a gain offset generating circuit 819, a switch 820 operated to be opened or closed in accordance with the LNA switch control signal AS generated from the CPU 113, and an adder 821 for adding a gain offset signal supplied from the gain offset generating circuit 819 via the switch 820, to the gain control signal for the opened-loop control which is output from the level detector 112.

With this configuration, when the LNA switch control signal AS of 'H' level that designates the low distortion operation mode is output from the CPU 113, the switch 820 is turned on and thereby the gain offset signal generated from the gain offset generating circuit 819 is added to the gain control signal for opened-loop control which is output from the level detector 112, in the adder 821. Thus, the level variation in the gain control signal for opened-loop transmission power control occurring together with the gain variation of the LNA 600 is corrected and, as a result, the transmitting power level can be kept constant regardless of the gain variation of the LNA 600.

In the present embodiment, a case where the gain control signal correcting means is applied to the radio transmitter-receiver shown in FIG. 3 has been exemplified. However, the same correcting means may be applied to the radio transmitter-receiver shown in each of FIGS. 5, 6 and 7.

(Other Embodiments)

The preset invention is not limited to the above embodiments. For example, a means for allowing the user to designate and input the low distortion operation mode and the low current consumption mode is provided at the radio transmitter-receiver, and when the low distortion operation mode or the low current consumption mode is designated and input by this mode designating and inputting means, the LNA operation mode of the receiving radio-frequency unit may be fixed to the designated and input operation mode.

For example, when the user designates and inputs the low current consumption mode, the LNA operation mode of the receiving radio-frequency unit is always set to be the low current consumption mode regardless of the standby state or the transmitting/receiving state.

With this setting, although the receiving sensitivity characteristics are deteriorated, shortage of charge can be put off when the remaining capacity of the battery for the radio transmitter-receiver is little.

In addition, in the radio transmitter-receiver of the dual-mode type employing the CDMA scheme and analog scheme such as the AMPS scheme, the changing of the low distortion operation mode and the low current consumption operation mode may be operated when the CDMA scheme is selected. On the other hand, the low current consumption operation mode may be fixed when the analog scheme is selected.

Furthermore, a case where the receiving radio-frequency unit 103 is constituted as shown in FIG. 4 has been exemplified in the first, second, third and fourth embodiments. However, the receiving radio-frequency unit 103 may be constituted as shown in FIGS. 8 and 9.

Moreover, a case where the operation mode of the LNA inside the receiving radio-frequency unit is changed has been explained in each of the above-described embodiments. However, the operation mode of other active circuits, such as the mixer and the like, inside the receiving radio-frequency unit may be changed together with the LNA. In this case, two mixers for the low distortion operation mode and for the low current consumption mode may be provided independently and switched, or a single mixer having both the low distortion operation mode and the low current consumption mode may be provided.

The constitution of the operation mode changing control means and its steps, the circuit configuration of the receiving radio-frequency unit, the kind and the constitution of the radio transmitter-receiver, and the like can be modified variously in a range which does not exceed the gist of the present invention.

Industrial Applicability

As described above in detail, according to the present invention, a receiving radio-frequency unit has a first operation mode in which an operation is executed at a predetermined first current consumption value and a predetermined first distortion characteristics, and a second operation mode in which an operation is executed at a second current consumption value larger than the first current consumption value and a second distortion characteristics having less distortion than the first distortion characteristics; and a mode changing control means allows the receiving radio-frequency unit to be operated in the second operation mode in a period in which the radio signal is transmitted, or in the first operation mode in a period in which the radio signal is not transmitted.

Therefore, the present invention can provide a radio receiver, a receiving radio-frequency unit thereof, and a control unit, capable of preventing deterioration of the receiving sensitivity caused by its own transmitting wave and the disturbance wave as well as suppressing the increase in the current consumption of the receiving radio-frequency unit, and thus extending the standby time or communications time with preferable receiving distortion characteristics.

What is claimed is:

1. A radio-transmitter receiver for simultaneously transmitting/receiving a radio signal including an amplitude variation component, comprising:

a receiving radio-frequency unit having a first operation mode in which an operation is executed at a predetermined first consumption value and with predetermined first distortion characteristics, and a second operation mode in which an operation is executed at a second current consumption value larger than said first current consumption value and with second distortion characteristics having less distortion than said first distortion characteristics;

mode changing control means for allowing said receiving radio-frequency unit to be operated in said second operation mode in a period in which the radio signal is transmitted, or in said first operation made in a period in which the radio signal is not transmitted;

open-loop transmission control means for detecting a receiving level of the radio signal on the basis of a received signal level which is output from said receiving radio-frequency unit, and generating a transmission level control signal on the basis of the detection value so as to variably control a transmitting level of the radio signal; and variation suppressing means for canceling variation components generated in the transmission level control signal generated in said open-loop transmission control means by the changing of the first operation mode or the second operation mode in said receiving radio-frequency unit.

2. A radio transmitter-receiver comprising:

a receiving radio-frequency unit provided in a radio transmitter-receiver for simultaneously transmitting/receiving a radio signal including an amplitude variation component, said receiving radio-frequency unit including:

a first active circuit section being operated at a predetermined first current consumption value and having predetermined first distortion characteristics;

a second active circuit having the same function as said first active circuit section, and being operated at a second current consumption value larger than said first current consumption value and having second distortion characteristics having less distortion than said first distortion characteristics, and a switching circuit section for allowing said second active circuit section to be operated selectively in a period in which the radio signal is transmitted, or allowing said first active circuit section to be operated selectively in a period in which the radio signal is not transmitted;

open-loop transmission control means for detecting a receiving level of the radio signal on the basis of a received signal level which is output from said receiving radio-frequency unit, and generating a transmission level control signal on the basis of the detection value so as to variably control a transmission level of the radio signal; and variation suppressing means for canceling variation components generated in the transmission level control signal generated in said open-loop transmission control means by changing to selectively operate in the first or the second active circuit section in said receiving radio-frequency unit.

3. A radio transmitter-receiver comprising:

a receiving radio-frequency unit for simultaneously transmitting/receiving a radio signal including an amplitude variation component, said receiving radio-frequency unit including:

a one-system active circuit section having a predetermined radio signal receiving function, and a bias supply changing circuit section for supplying a first bias current allowing said active circuit section to be operated at a predetermined first current consumption value and with predetermined first distortion characteristics, in a period in which the radio signal is transmitted, and for supplying a second bias current allowing said active circuit section to be operated at a second current consumption value larger than said first current consumption value and with second distortion characteristics having less distortion than said first distortion characteristics, in a period in which the radio signal is not transmitted;

open-loop transmission control means for detecting a receiving level of the radio signal on the basis of a received signal level which is output from said receiving radio-frequency unit, and generating a transmission level control signal on the basis of the detection value so as to variably control a transmission level of the radio signal; and variation suppressing means for canceling variation components generated in the transmission level control signal generated in said open-loop transmission control means by changing of supply of the bias currents in said receiving radio-frequency unit.

4. A radio transmitter-receiver comprising:

a receiving radio-frequency unit for simultaneously transmitting/receiving a radio signal including an amplitude variation component, said receiving radio-frequency unit including:

a first active circuit being operated at a predetermined first current consumption value and having predetermined first distortion characteristics, said first active circuit having a first amplifier and a pair of first matching circuits respectively connected to an input side and an output side of the first amplifier;

a second active circuit having the same function as the first active circuit, and being operated at a second current consumption value larger than the first current consumption value and having second distortion characteristics having less distortion than the first distortion characteristics, said second active circuit having a second amplifier and a pair of second matching circuits respectively connected to an input side and an output side of the second amplifier;

a switching circuit for allowing the second active circuit to be operated selectively in a period in which the radio signal is transmitted, and allowing the first active circuit to be operated selectively in a period in which the radio signal is not transmitted;

open-loop transmission control means for detecting a receiving level of the radio signal on the basis of a received signal level which is output from the receiving radio-frequency unit, and generating a transmission level control signal on the basis of the detection value so as to variably control a transmission level of the radio signal; and variation suppressing means for canceling variation components generated in the transmission level control signal generated in the open-loop transmission control means by changing of supply of bias currents in the receiving radio-frequency unit.

* * * * *